(12) United States Patent
Hess et al.

(10) Patent No.: US 11,747,782 B1
(45) Date of Patent: Sep. 5, 2023

(54) SYSTEMS AND METHODS FOR PROVIDING POWER CONSUMPTION PREDICTIONS FOR SELECTED APPLICATIONS WITHIN NETWORK ARRANGEMENTS FEATURING DEVICES WITH NON-HOMOGENOUS OR UNKNOWN SPECIFICATIONS

(71) Applicant: Citibank, N.A., New York, NY (US)

(72) Inventors: Adam Hess, Roanoke, TX (US); Dawid Orczyk, Pawłów (PL); Dominik Wojnarowski, Warsaw (PL); Krzysztof Andrzejewski, Warsaw (PL); Pawel Chrabonszcz, Nowa Iwiczna (PL)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/157,781

(22) Filed: Jan. 20, 2023

(51) Int. Cl.
*G05B 19/042* (2006.01)
*G06F 9/30* (2018.01)
*G06F 1/3206* (2019.01)
*G06F 1/3215* (2019.01)
*G06F 1/3287* (2019.01)

(52) U.S. Cl.
CPC ......... *G05B 19/042* (2013.01); *G06F 1/3206* (2013.01); *G06F 1/3215* (2013.01); *G06F 1/3287* (2013.01); *G06F 9/30083* (2013.01); *G05B 2219/2639* (2013.01)

(58) Field of Classification Search
CPC .......... G05B 19/042; G05B 2219/2639; G06F 1/3206; G06F 1/3215; G06F 1/3287; G06F 9/30083
See application file for complete search history.

(56) References Cited

U.S. PATENT DOCUMENTS

| | | | |
|---|---|---|---|
| 2009/0204789 A1* | 8/2009 | Gooding | G06F 9/5066 712/28 |
| 2010/0211810 A1* | 8/2010 | Zacho | G06F 1/3203 713/320 |
| 2012/0030356 A1* | 2/2012 | Fletcher | G06F 9/5094 709/226 |
| 2017/0026305 A1* | 1/2017 | Barrett | H04L 41/20 |
| 2017/0026486 A1* | 1/2017 | Tran | H04L 67/10 |
| 2019/0370141 A1* | 12/2019 | Choi | G06F 11/3466 |

* cited by examiner

*Primary Examiner* — Chad G Erdman
(74) *Attorney, Agent, or Firm* — Perkins Coie LLP (57) ABSTRACT

Systems and methods are described herein for novel uses and/or improvements to artificial intelligence applications in an environment with limited or no available data. In particular, systems and methods are described herein for providing power consumption predictions for selected applications within network arrangements featuring devices with non-homogenous or unknown specifications.

20 Claims, 7 Drawing Sheets

| Unit | Power Consumption |
|---|---|
| Device 1a | 200Wh |
| Device 2a | 200Wh |
| Device 3a | 200Wh |
| Device 4a | 200Wh |
| Device 5a | 200Wh |
| Device 6a | 200Wh |
| Device 7a | 200Wh |
| Device 8a | 200Wh |
| Rack A (sum for devices 1a-8a) | 1600Wh |
| Device 1b | 200Wh |
| Device 2b | 200Wh |
| Device 3b | 200Wh |
| Device 4b | 200Wh |
| Device 5b | 200Wh |
| Device 6b | 200Wh |
| Device 7b | 200Wh |
| Device 8b | 200Wh |
| Rack B (sum for devices 1b-8b) | 1600Wh |
| Tech room 1 (sum for Racks A and B) | 3200Wh |

| Application | Unit | Power Consumption |
|---|---|---|
| Application A | Device 1a | 200Wh |
| Application A | 50% Device 2a | 100Wh |
| Application A | Device 3a | 200Wh |
| Application B | 50% Device 2a | 100Wh |
| Application B | Device 4a | 200Wh |
| Application C | Device 5a | 200Wh |
| Application D | Device 6a | 200Wh |
| Application E | 25% Device 7a | 50Wh |
| Application F | 75% Device 7a | 150Wh |
| Application F | Device 8a | 200Wh |
| | Rack A (sum for devices 1a-8a) | 1600Wh |

| Unit | Power Consumption | Efficency |
|---|---|---|
| Device 1a | 200Wh | 1 switch port/1Wh |
| Device 2a | 200Wh | 1 switch port/10Wh |
| Device 3a | 200Wh | 1 GB of capacity/100Wh |
| Device 4a | 200Wh | 1 GB of capacity/80Wh |
| Device 5a | 200Wh | 1 virtual server of given config/ 10Wh |

280

| Application | Unit | Power Consumption | CO2 emission |
|---|---|---|---|
| Application A | Device 1a | 200Wh | 200g/h |
| Application A | 50% Device 2a | 100Wh | 100g/h |
| Application A | Device 3a | 200Wh | 200g/h |
| Application B | 50% Device 2a | 100Wh | 100g/h |
| Application B | Device 4a | 200Wh | 200g/h |
| Application C | Device 5a | 200Wh | 200g/h |
| Application D | Device 6a | 200Wh | 200g/h |
| Application E | 25% Device 7a | 50Wh | 50g/h |
| Application F | 75% Device 7a | 150Wh | 150g/h |
| Application F | Device 8a | 200Wh | 200g/h |
| | Rack A (sum for devices 1a-8a) | 1600Wh | 1600g/h |

SYSTEMS AND METHODS FOR PROVIDING POWER CONSUMPTION PREDICTIONS FOR SELECTED APPLICATIONS WITHIN NETWORK ARRANGEMENTS FEATURING DEVICES WITH NON-HOMOGENOUS OR UNKNOWN SPECIFICATIONS

BACKGROUND

Artificial intelligence, including, but not limited to, machine learning, deep learning, etc. (referred to collectively herein as artificial intelligence models, machine learning models, or simply models) has excited the imaginations of both industry enthusiasts as well as the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. First, artificial intelligence typically relies on training a model to make predictions and/or perform functions. Such training requires large amounts of high-quality data through which historical patterns may be detected. Additionally, the process for obtaining this data and ensuring it is high-quality is often complex and time-consuming. These technical problems present an inherent problem with attempting to use an artificial-intelligence-based solution in environments with limited or no available data.

SUMMARY

Systems and methods are described herein for novel uses and/or improvements to artificial intelligence applications in an environment with limited or no available data. In particular, systems and methods are described herein for providing power consumption predictions for selected applications within network arrangements featuring devices with non-homogenous or unknown specifications.

For example, most computer applications rely on complex processes and technically diverse network arrangements. These network arrangements feature numerous non-homogenous devices (e.g., devices with different hardware, configurations, software/operating systems and/or other specifications). One of the features common to any computer equipment is its demand for the electrical energy required for its operation and the associated emission of carbon dioxide emitted into the atmosphere during the production of electricity. Along with growing environmental awareness and legal regulations, many entities are obligated to reduce carbon dioxide emissions. One of the many areas in which changes are expected is the information technology infrastructure, which is commonly indicated as an area generating high carbon emission values. In order to be able to make decisions in this regard, it is necessary to know the current electricity consumption and the associated carbon emission values for all components of the infrastructure.

However, this presents a severe technical challenge. For example, while it is possible to measure a current power consumption for a specific device (e.g., a single computer), a set of devices (a cabinet with several devices—in a server room "rack"), or entire dedicated areas (technical room, data center), it is difficult or even impossible to do so on the application level, particularly in complex network arrangements due to the amount of variables that dynamically change and the number of devices with non-homogenous or unknown specifications.

The use of artificial intelligence models to detect and/or make predictions on these dynamically changing variables potentially offers a solution. However, the difficulty in adapting artificial intelligence models for this practical benefit faces several technical challenges such as the lack of any available training data. Furthermore, what data is available is often incomplete. For example, while data on some standardized hardware and computer components may be available, many network arrangements involved custom or specialized hardware components. Furthermore, each application may use available hardware and computer components (whether standardized or not) in unique and random fashions.

Despite these technical challenges in adapting artificial intelligence models for this practical benefit, systems and methods are disclosed for providing power consumption predictions at an application-specific level even within network arrangements that feature devices with non-homogenous or unknown specifications. The systems and methods overcome these technical challenges by generating, and training a model on, a device profile repository that includes device profiles that are based on known specifications (e.g., specifications provided by a manufacturer of standardized computer hardware), but also device profiles based on virtual specifications. For example, through the use of device profiles based on virtual specifications, the systems and methods generate a "digital twin" of devices having non-homogenous or unknown specifications. By using this digital twin, the system may complete incomplete sets of training data and thus properly train the artificial intelligence model.

To generate the digital twin, the systems and methods may generate a network mapping of a computer network. The network mapping may indicate relationships between a plurality of devices in the computer network through the use of a series of interconnected nodes in which the nodes represent specific devices and the edges between nodes indicate the relationships. Furthermore, the network mapping may be populated with respective known specifications, wherein the respective known specifications are based on respective vendor information, respective model information, respective serial number information, or respective geographical location information. The system may then infer respective virtual specifications for any devices with non-homogenous or unknown specifications based on the relationships between the plurality of devices and the respective known specifications. By doing so, the system may generate the needed virtual specifications that "fill in the gaps" of the network mapping and allow for an artificial intelligence model to be properly trained to provide power consumption predictions at an application-specific level even within network arrangements that feature devices with non-homogenous or unknown specifications.

In some aspects, systems and methods for providing power consumption predictions for selected applications within network arrangements featuring devices with non-homogenous or unknown specifications are described. For example, the system may receive a first user request to generate a first application-specific power consumption prediction for a first application. The system may determine a first usage metric for the first application, wherein the first usage metric describes metadata related to one or more processes performed by the first application across a first network, wherein the first network comprises a plurality of devices. The system may determine, from the plurality of devices, a first subset of devices for serving the first application based on the first usage metric. The system may retrieve, from a device profile repository, a first subset of device profiles corresponding to devices in the first subset of devices, wherein the device profile repository comprises a first set of device profiles corresponding to devices with known specifications and a second set of device profiles corresponding to devices with virtual specifications. The system may determine, using a first model, a first output, wherein the first model is trained to generate application-specific power consumption predictions for respective applications based on inputted usage metrics for the respective applications and respective device profiles, from the device profile repository, for devices serving the respective applications. The system may generate for display, on a user interface, the first application-specific power consumption prediction based on the first output.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
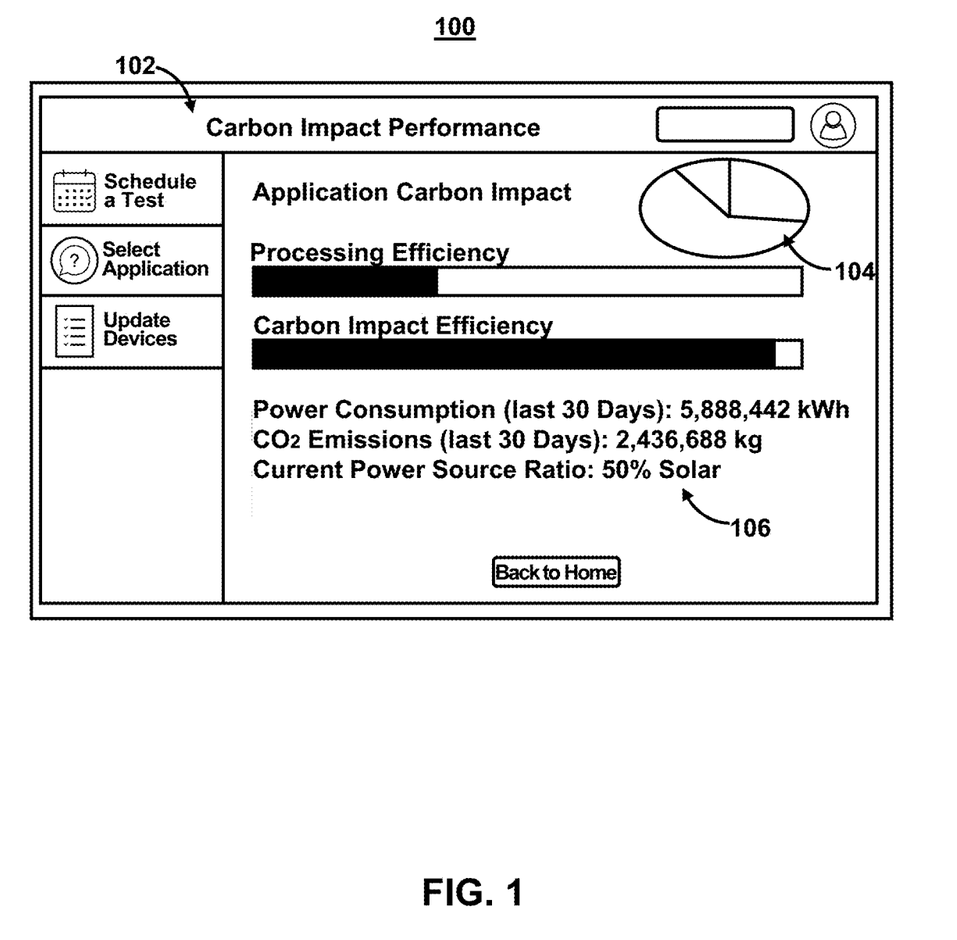
FIG. 1 shows an illustrative diagram for a user interface related to power consumption predictions, in accordance with one or more embodiments.

FIG. 1 shows an illustrative diagram for a user interface related to power consumption predictions, in accordance with one or more embodiments. For example, systems and methods are described herein for providing power consumption predictions for selected applications within network arrangements featuring devices with non-homogenous or unknown specifications. These predictions may be shown in user interface 100.

As referred to herein, a "user interface" may comprise a human-computer interaction and communication in a device, and may include display screens, keyboards, a mouse, and the appearance of a desktop. For example, a user interface may comprise a way a user interacts with an application or a website. User interface 100 may present content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. In some embodiments, the content may relate to carbon impact.

In some embodiments, the system may identify a carbon impact (e.g., a carbon dioxide output, energy consumption, carbon footprint, and/or other emissions standard) of a business application within an enterprise datacenter infrastructure. By doing so, the system may recommend changes to the application's deployment in the future for a lower carbon impact. To do so, the system may collect various data points of the technology infrastructure items that make up the underlying environment for the application to run on. The system may determine metrics such as capacity, utilization, power consumption, location, usage, application assignment within the enterprise, etc. In addition, the system may gather metrics from the datacenter itself such as power feeds, the type of power production for those feeds, locations, and the generally accepted carbon offset to the power at a specific rate in those locations based on the feed source.

The system may determine power consumption predictions, which may comprise a prediction based on a past, current, and/or future time period. Furthermore, the power consumption prediction may be expressed in terms of a carbon impact. As referred to herein, a "carbon impact" may comprise a quantitative or qualitative measure based on carbon dioxide output, energy consumption, carbon footprint, and/or other emissions standard such as global emissions factors (e.g., emission factors in grams $CO_2e$ per kilowatt-hour). For example, the system may determine a carbon impact based on the total greenhouse gas ("GHG") emissions caused by an individual, event, organization, service, place or product expressed as carbon dioxide equivalent ($CO_2$). Greenhouse gases, including the carbon-containing gases carbon dioxide and methane, can be emitted through the burning of fossil fuels, land clearance, and the production and consumption of food, manufactured goods, materials, wood, roads, buildings, transportation and other services. The emission of these gases may be used to generate electricity (e.g., electricity used to power electronic devices). The system may translate the amount of electricity used to power a device (or group of devices) servicing an application into a measure of the carbon impact.

In some embodiments, the application-specific power consumption prediction may comprise a prediction related to a past, current, and/or future use of power. Additionally or alternatively, the system may express the prediction in terms of carbon impact. For example, as shown in FIG. 1, user interface 100 may present carbon impact performance summary 102. User interface 100 may present content in numerous forms such as textual or graphical data (e.g., graph 104). Additionally or alternatively, the system may present quantitative or qualitative metrics related to the content. For example, as shown in user interface 100, the system may present current metrics on power consumption, carbon emissions, and/or power sources.

Each of the metrics may further be specific to a given application. For example, user interface 100 may generate information related to power consumption and/or carbon impact for a selected application. This information may be based on time-series data and presented in real-time. As described herein, "time-series data" may include a sequence of data points that occur in successive order over some period of time. In some embodiments, time-series data may be contrasted with cross-sectional data, which captures a point in time. A time series can be taken on any variable that changes over time. The system may use a time series to track the variable (e.g., power consumption and/or carbon impact) over time. This can be tracked over the short term or the long term. The system may generate a time series analysis. For example, a time series analysis may be useful to see how a variable changes over time. It can also be used to examine how the changes associated with the chosen data point compare to shifts in other variables over the same time period.

The time-series analysis may determine various trends such as a secular trend, which describes the movement along the term, a seasonal variation, which represents seasonal changes, cyclical fluctuations, which correspond to periodical but not seasonal variations, and irregular variations, which are other nonrandom sources of variations of series. The system may maintain correlations for this data during modeling. In particular, the system may maintain correlations through non-normalization as normalizing data inherently changes the underlying data, which may render correlations, if any, undetectable and/or lead to the detect of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depends heavily on the normalization choices. Thus, normalization may lead to lower model performance and more model errors. The use of a non-parametric bias test alleviates the need for normalization, while still allowing the methods and systems to determine a respective proportion of error detections for each of the plurality of time-series data models.

As referred to herein, a "modeling error" or simply an "error" may correspond to an error in the performance of the model. For example, an error in a model may comprise an inaccurate or imprecise output or prediction for the model. This inaccuracy or imprecision may manifest as a false positive or a lack of detection of a certain event. These errors may occur in models corresponding to a particular sub-segment (e.g., a component model as described herein) that result in inaccuracies for predictions and/or output based on the sub-segment, and/or the errors may occur in models corresponding to an aggregation of multiple sub-segments (e.g., a composite model as described herein) that result in inaccuracies for predictions and/or outputs based on errors received in one or more of predictions of the plurality of sub-segments and/or an interpretation of the predictions of the plurality of sub-segments.

Figure 2A:
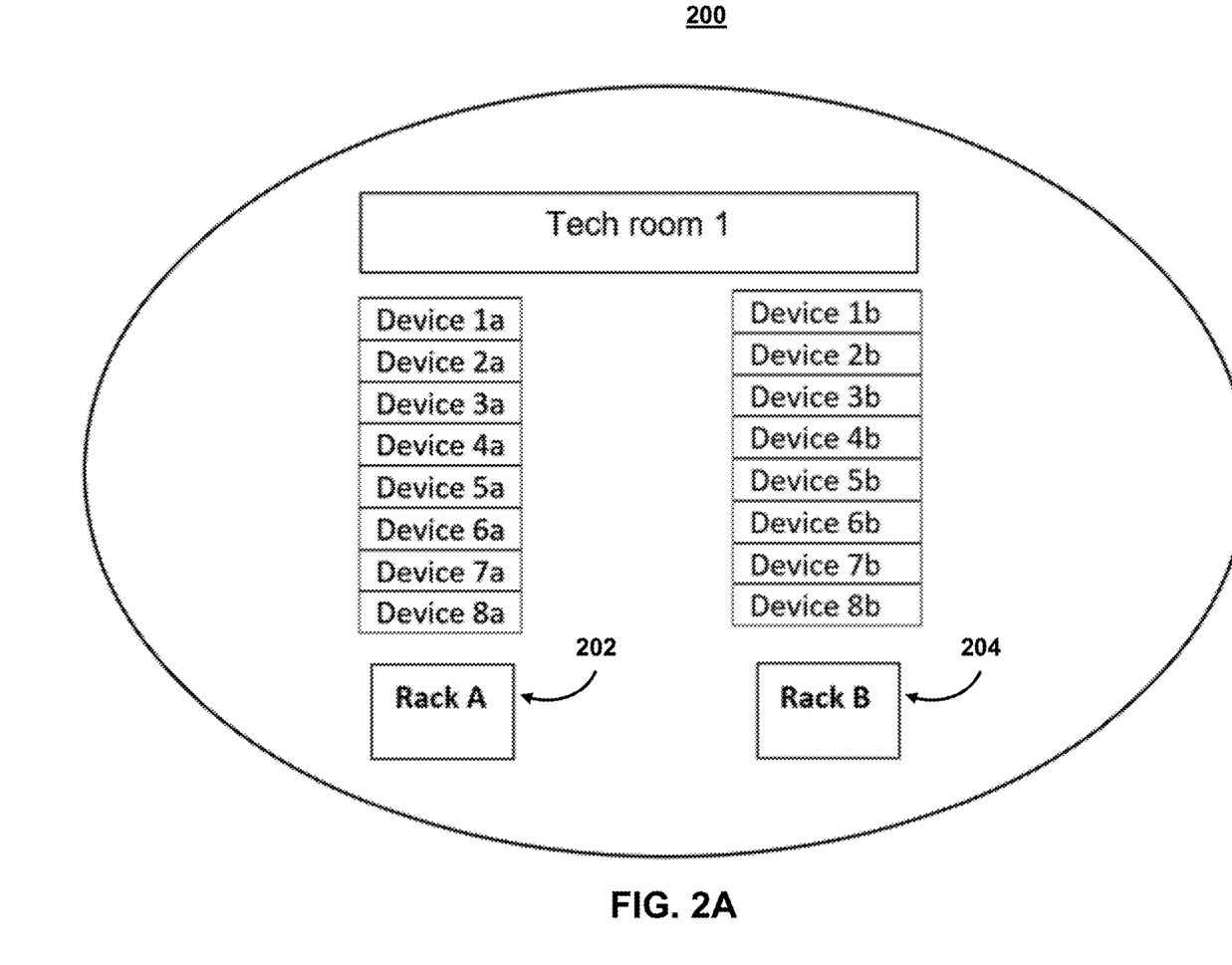
FIGS. 2A-D show an illustrative diagram for related to power consumption predictions, in accordance with one or more embodiments.

FIGS. 2A-D show an illustrative diagram for related to power consumption predictions, in accordance with one or more embodiments. For example, FIG. 2A shows an illustrative diagram of a network (e.g., comprising a set of devices). For example, most computer applications rely on complex processes and technically diverse network arrangements. These network arrangements feature numerous non-homogenous devices (e.g., devices with different hardware, configurations, software/operating systems and/or other specifications). One of the features common to any computer equipment is its demand for the electrical energy required for its operation and the associated emission of carbon dioxide emitted into the atmosphere during the production of electricity. Along with the growing environmental awareness and legal regulations, many entities are obligated to reduce carbon dioxide emissions. One of the many areas in which changes are expected is the information technology infrastructure, which is commonly indicated as an area generating high carbon emission values. In order to be able to make decisions in this regard, it is necessary to know the current electricity consumption and the associated carbon emission values for all components of the infrastructure.

However, this presents a severe technical challenge. For example, while it is possible to measure a current power consumption for a specific device (e.g., a single computer), a set of devices (a cabinet with several devices—in a server room "rack"), or entire dedicated areas (technical room, data center), it is difficult or even impossible to do so on the application level, particularly in complex network arrangements due to the amount of variables that dynamically change and the number of devices with non-homogenous or unknown specifications. For example, diagram 200 may include rack 202 and rack 204. For example, diagram 200 may represent a technical room with two cabinets with equipment and eight devices in each of the cabinets.

Figure 2B:
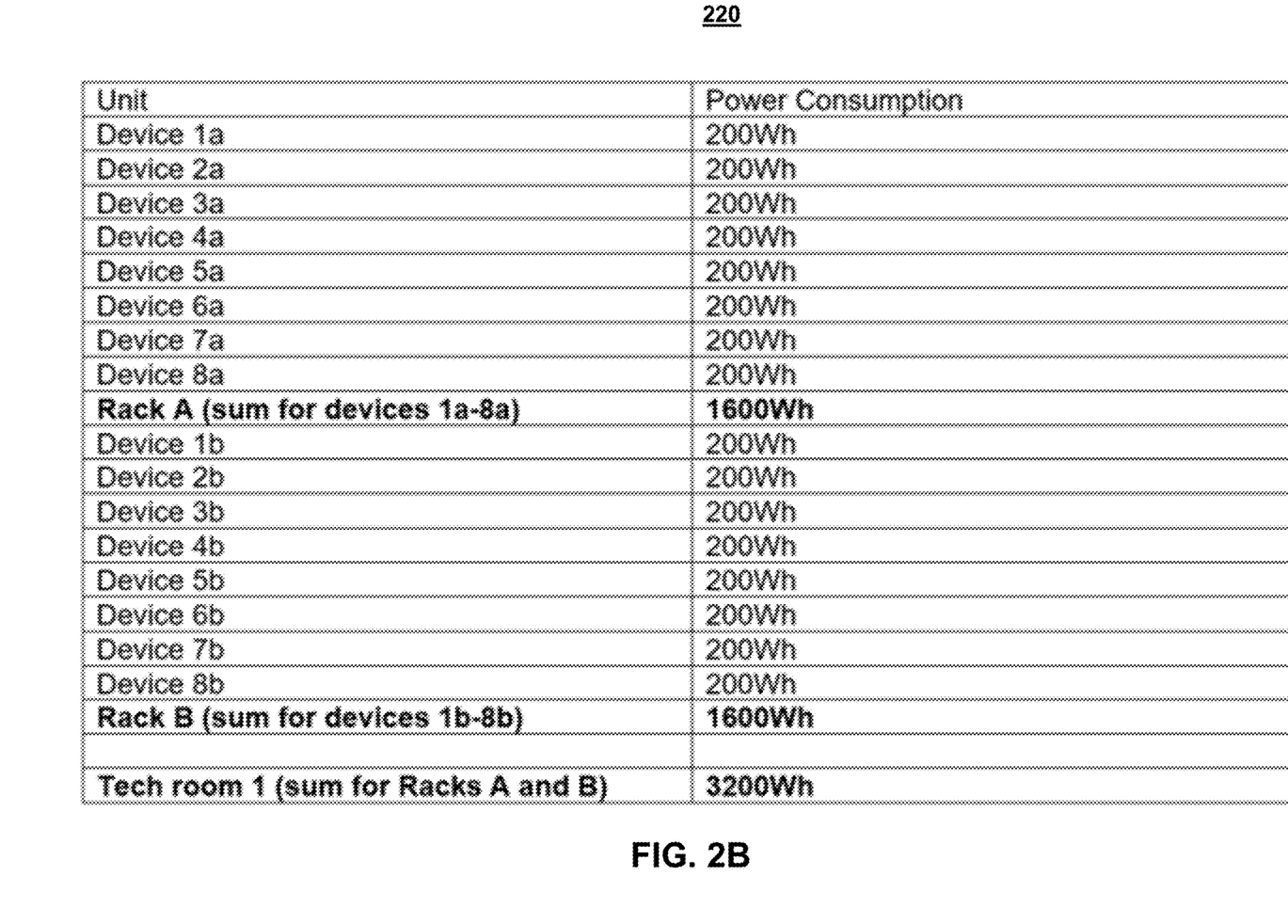

FIG. 2B shows an illustrative diagram of power consumption levels for the set of devices of FIG. 2A. For example, table 220 comprises examples of current power consumption values (e.g., usage metrics) that the system may obtain. As shown in table 220, although there are some usage metrics provided, the usage metrics are not sufficient to make informed decisions about reducing carbon impact for this environment. Furthermore, there is no conventional system for automatic mapping of business processes to the infrastructure used, no information on the percentage share of hardware usage for business processes—in particular for shared infrastructure (virtualization systems, storage systems, network devices, etc.), a lack of detailed information on the efficiency of the use of equipment versus energy demand, and no information on the relationship between the energy demand and the amount of carbon emissions associated with the generation of electricity in each location/building.

As such, adapting artificial intelligence models for this practical benefit faces several technical challenges such as the lack of any available training data. Furthermore, what data is available is often incomplete. For example, while data on some standardized hardware and computer components may be available, many network arrangements involve custom or specialized hardware components. Furthermore, each application may use available hardware and computer components (whether standardized or not) in unique and random fashions.

Despite these technical challenges in adapting artificial intelligence models for this practical benefit, systems and methods are disclosed for providing power consumption predictions at an application-specific level even within network arrangements that feature devices with non-homogenous or unknown specifications. The systems and methods overcome these technical challenges by generating, and training a model on, a device profile repository that includes device profiles that are based on known specifications (e.g., specifications provided by a manufacturer of standardized computer hardware), but also device profiles based on virtual specifications. For example, through the use of device profiles based on virtual specifications, the systems and methods generate a digital twin of devices having non-homogenous or unknown specifications. By using this digital twin, the system may complete incomplete sets of training data and thus properly train the artificial intelligence model.

For example, the system may collect various data points of the technology infrastructure items that makeup the underlying environment for the application to run on. For example, the system may collect usage metrics, which may comprise metrics that describe the features, functions, capabilities, and/or other attributes of a specific device. The usage metrics may include capacity, utilization, power consumption, location, usage, application assignment within the enterprise, etc. In addition, the system may gather metrics for a network (or portion of a network) itself such as power feeds, the type of power production for those feeds, locations, and/or the carbon offset to the power at a specific rate in those locations based on the feed source.

The system may use automated or manual data collectors to determine the current consumption data of devices, the type of devices, and/or other information about a network. As referred to herein, a "device profile" may comprise the set of attributes (services, capabilities, and/or features) associated with a particular device. The system may then generate a "known" device profile based on these "known" specifications. For example, the system map probes devices for information related to respective vendor information, respective model information, respective serial number information, or respective geographical location information. For example, a specification may comprise information and/or metadata related to hardware, software, protocols, and/or the connection medium of a device as well as the performance thereof.

In some embodiments, the system may detect gaps in the network mapping that corresponds to nodes in the mapping (e.g., devices in the network) for which the specifications are not standardized and/or are otherwise unknown. In such cases, the system may generate a "virtual device profile" and the virtual device profile may comprise "virtual specifications." As referred to herein, a "virtual specification" refers to an operating performance specification for a network device that is not defined by an equipment vendor. For example, a virtual specification may be inferred based on monitoring and/or probing one or more devices connected to (and/or integrating with) another device. In some examples, the virtual specification may be based on similar devices and/or similar known specifications (e.g., as provided by a vendor of the device). In some embodiments, the virtual device profile may comprise a virtual representation of a given device and estimates of energy demand in accordance with a specific configuration and technical documentation.

In some embodiments, a device profile may be further defined into "device sub-profiles." Device sub-profile may comprise a portion, segment, and/or other designation of one or more processes, components, and/or functions of a device. For example, in some embodiments, the system may perform calculations on "device profiles" which are calculated based on the resources allocated/consumed by a specific application. In such cases, the system may refer to a device sub-profile of a device profile that corresponds to a designated application.

Figure 2C:
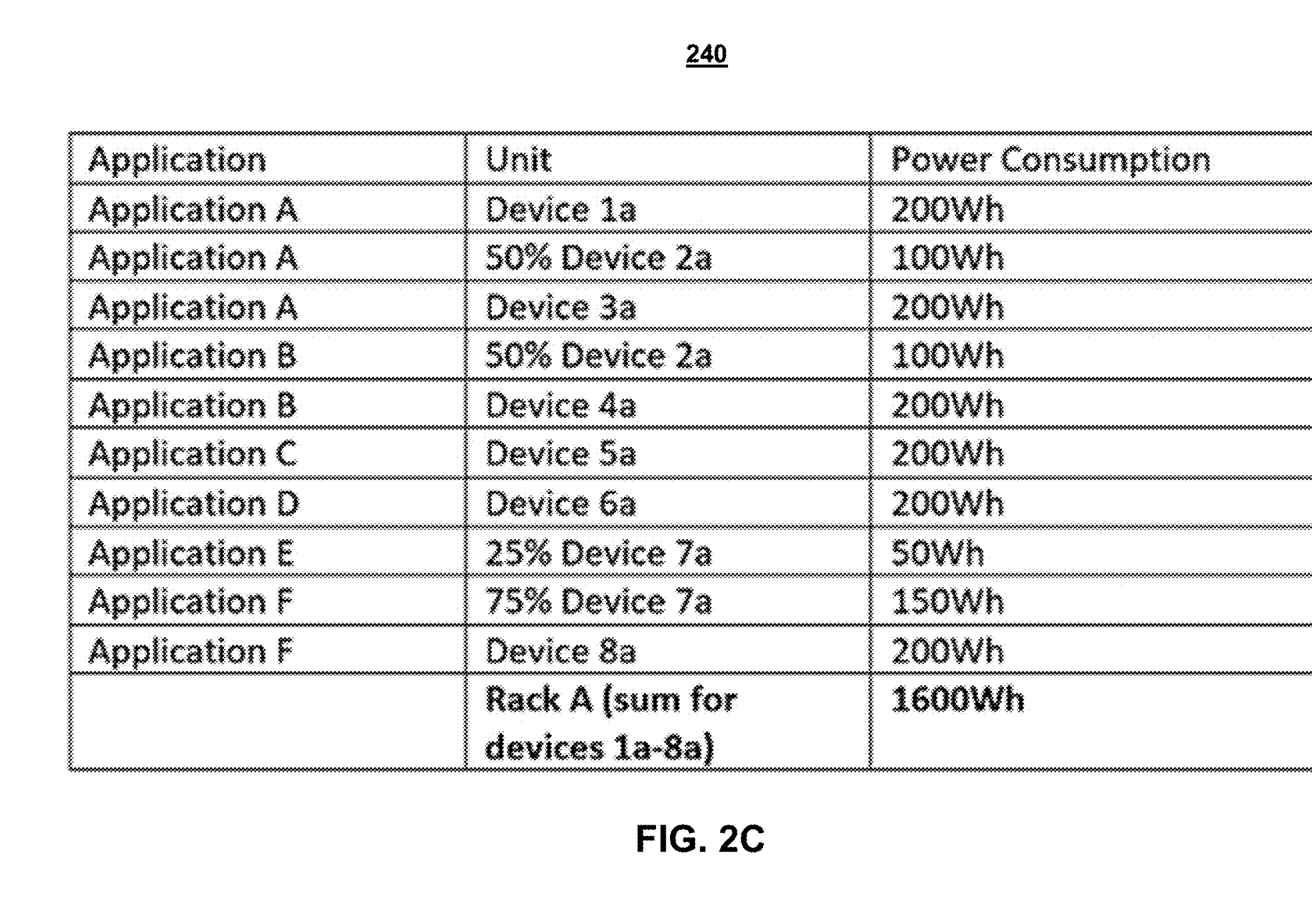

FIG. 2C shows an illustrative diagram of a network mapping for the set of devices of FIG. 2A. For example, as shown in table 240, the system may generate several types of information. As shown, each device is assigned to a specific application. This may be predetermined and/or determined dynamically based on use. The system may record and/or store this information in a central register of applications and/or a central register of devices, which may comprise a device profile repository.

As referred to herein, the device profile repository comprises a datastore or other memory comprising a plurality of device profiles. The device profiles may comprise both known device profiles as well as virtual device profiles. As a result, a list of devices with an assigned number and name of the device is produced. In the case of shared infrastructure, the percentage of resource utilization for each application may be calculated separately. In some embodiments, the exact specificity of the calculation depends on the type/purpose of the equipment. The system may also determine specific information based on a type of device (e.g., metrics for storage devices may comprise storage capacity utilized, metrics for network devices may comprise the number of ports used on switches in the physical and virtual layers (e.g., as a percentage of traffic in connections between switches)), and for virtualization tier servers, the metrics may comprise the amount of virtual resources allocated, etc.

As shown in table 240, for the components, both from the perspective of the hardware itself and also from the perspective of the application, the system may calculate the efficiency of use. In some embodiments, the exact specificity of the calculation depends on the type/purpose of the equipment. The system may also determine specific information based on a type of device (e.g., for storage devices, the system may calculate logical amount of data stored versus power consumption (and logical amount of stored data versus carbon emissions), for network devices, the system may calculate the number of network ports used versus power consumption (and number of network ports used versus carbon emissions), and for virtualization tier servers, the system may calculate the size of allocated virtual resources versus power consumption (and the size of allocated virtual resources versus carbon emissions)).

Figure 2D:
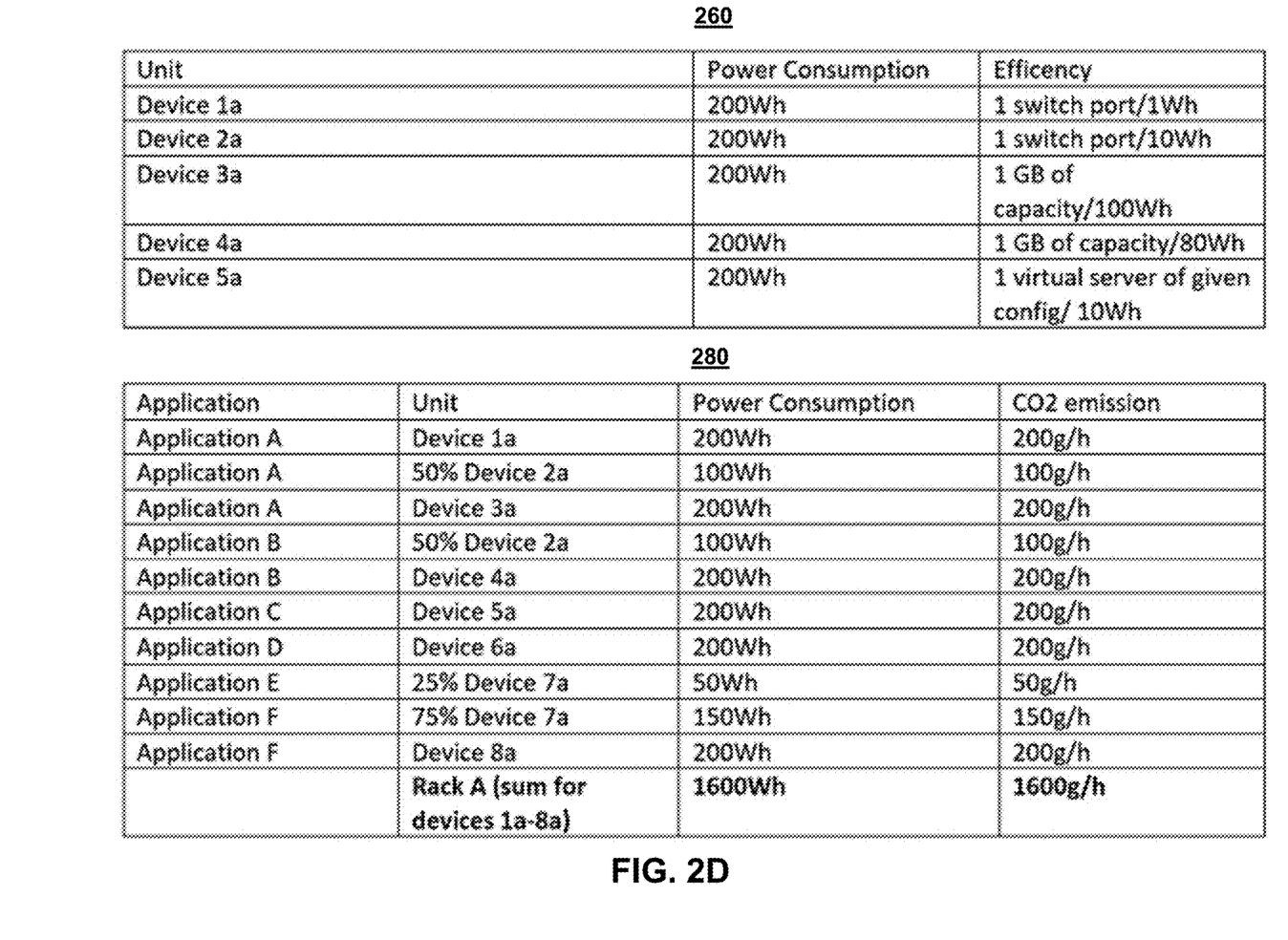

FIG. 2D shows an illustrative diagram of predicted efficiencies for the set of devices of FIG. 2A. For example, as shown in FIG. 2D, the system may calculate a power consumption and efficiency for each device (table 260) and/or application (table 280). The system may then, based on information on a power source of energy supply for each of the devices and/or information on the cost of electricity production expressed in carbon emissions, generate data for each device and/or each application.

For example, based on received metrics, the system calculates the carbon impact, based on power consumption, for the infrastructure components that the application utilizes. This is then combined with similar information within a dashboard (e.g., user interface 100 (FIG. 1)) for a visual representation and comparison of carbon impacts based on business, application-specific, technology-specific, location-specific, and other scenarios. The data, the impact scoring, and the viewpoints are all made available by the system to users for discussion, investigation, and/or decisioning on what changes should occur to adjust the carbon impact in a positive direction.

Figure 3:
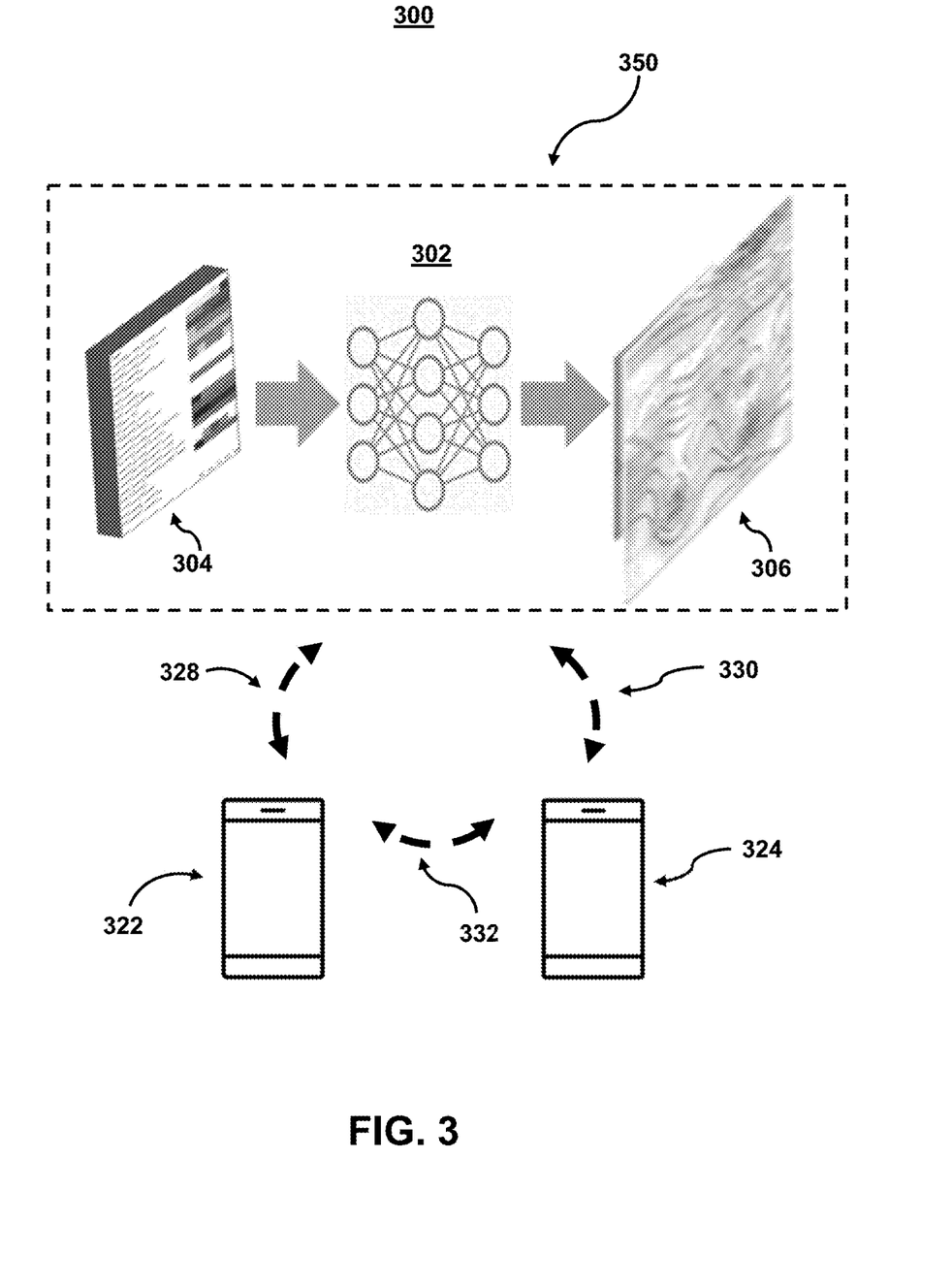
FIG. 3 shows illustrative components for a system used to generate power consumption predictions, in accordance with one or more embodiments.

For example, as further described in FIG. 3, the system may use a model and/or algorithm that collects a list of devices (including vendor, model, type, serial number, name, geographical location), pulls device power consumption (or builds a digital twin if needed), pulls device utilization (e.g., total capacity, used capacity), calculates device efficiency (e.g., by comparing two figures: power consumption/total capacity versus power consumption/used capacity), collects a list of applications and/or their processes running on the device (e.g., based on an application identifier and server (client) name), calculates percentage of resources consumed by application/process on the device, and uses global emissions factors per location to calculate carbon emission values for the devices and applications.

FIG. 3 shows illustrative components for a system used to generate power consumption predictions, in accordance with one or more embodiments. As shown in FIG. 3, system 300 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a handheld computer, and other computer equipment (e.g., a server), including "smart," wireless, wearable, and/or mobile devices. System 300 may also include cloud components. For example, cloud components may be implemented as a cloud computing system and may feature one or more component devices. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

System 300 also includes model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., an energy consumption prediction, a carbon impact, a virtual specification, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, the model (e.g., model 302) may automatically perform actions based on outputs 306. In some embodiments, the model (e.g., model 302) may not perform any actions. The output of the model (e.g., model 302) may be used to determine an energy consumption prediction, a carbon impact, a virtual specification, etc.

As shown in FIG. 3, in some embodiments, model 302 may be trained by taking inputs 304 and provide outputs 306. Model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., an energy consumption prediction, a carbon impact, a virtual specification, etc.).

Model 302 is shown as a convolutional neural network. A convolutional neural network consists of an input layer (e.g., input 304), hidden layers, and an output layer (e.g., output 306). As shown in FIG. 3, the middle layers are called hidden because their inputs and outputs are masked by the activation function and final convolution. In a convolutional neural network, the hidden layers include layers that perform convolutions. Model 302 may comprise convolutional layers that convolve the input and pass its result to the next layer. Model 302 includes local and/or global pooling layers along with traditional convolutional layers. Pooling layers reduce the dimensions of data by combining the outputs of neuron clusters at one layer into a single neuron in the next layer. Also as shown, model 302 may comprise fully connected layers that connect every neuron in one layer to every neuron in another layer.

Figure 4:
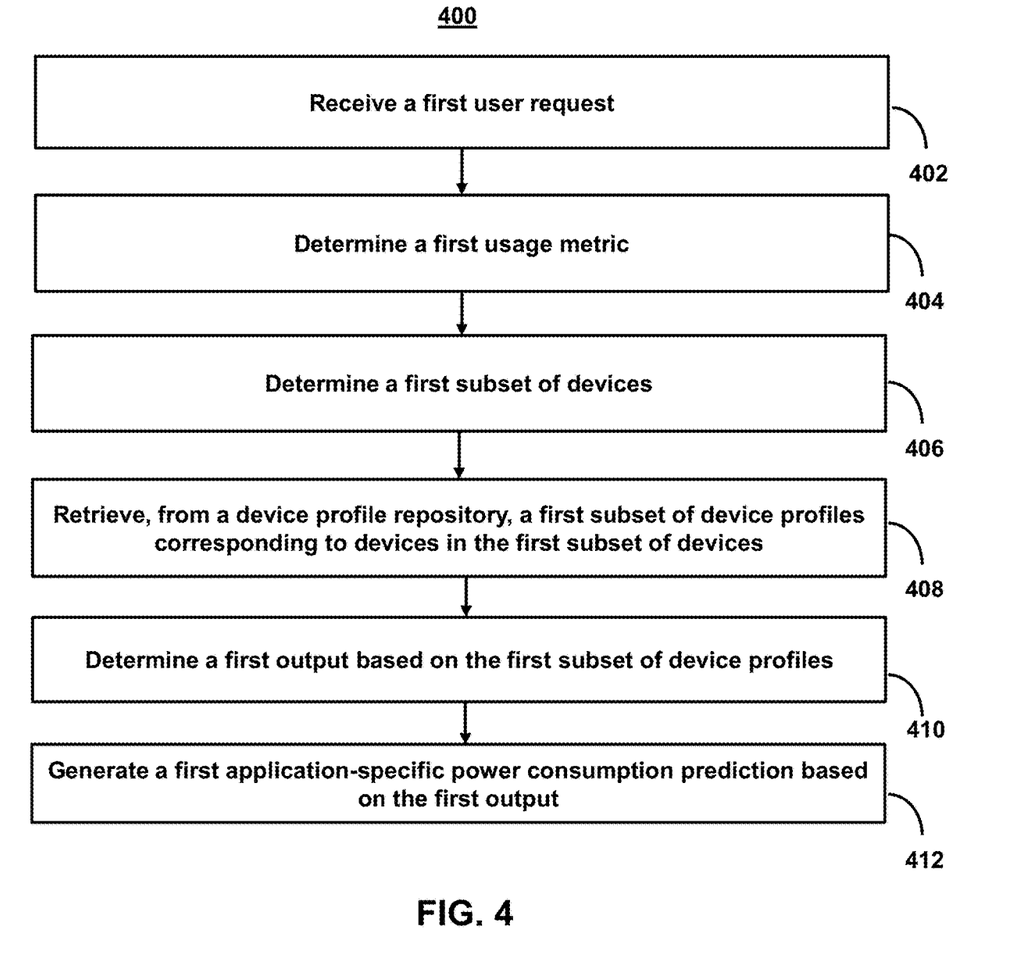
FIG. 4 shows a flowchart of the steps involved in generating power consumption predictions, in accordance with one or more embodiments.

FIG. 4 shows a flowchart of the steps involved in generating power consumption predictions, in accordance with one or more embodiments. For example, the system may use process 400 (e.g., as implemented on one or more system components described above) in order to provide power consumption predictions for selected applications within network arrangements featuring devices with non-homogenous or unknown specifications. For example, the system may use a model and/or algorithm that collects a list of devices (including vendor, model, type, serial number, name, geographical location), pulls device power consumption (or builds a digital twin if needed), pulls device utilization (total capacity, used capacity), calculates device efficiency (e.g., by comparing two figures: power consumption/ total capacity versus power consumption/used capacity), collects a list of applications and/or their processes running on the device (e.g., based on an application identifier and server (client) name), calculates percentage of resources consumed by application/process on the device, and uses global emissions factors per location to calculate carbon emission values for the devices and applications.

At step 402, process 400 (e.g., using one or more components described above) receives a first user request. For example, the system may receive a first user request to generate a first application-specific power consumption prediction for a first application. For example, the system may receive a request from a user to see current or prediction energy consumption and/or carbon related emissions stemming from the use of one or more applications in one or more device arrangements within a network.

At step 404, process 400 (e.g., using one or more components described above) determines a first usage metric. For example, the system may determine a first usage metric for the first application, wherein the first usage metric describes metadata related to one or more processes performed by the first application across a first network, wherein the first network comprises a plurality of devices. The system may determine one or more usage metrics for the first application. These usage metrics may comprise present power consumption as expressed in watt-hours, total capacity expressed in terabytes for storage arrays and number of ports for switches, used capacity expressed in terabytes for storage arrays and number of ports for switches, a list of logical data volumes created on data arrays for client's consumption, logical data volumes utilization expressed in gigabytes, a list of (or number of) servers (clients) connected to the logical data volumes, and/or other global emissions factors.

In some embodiments, the system may determine one or more usage metrics. For example, the usage metric may describe the present power consumption (e.g., expressed in watt-hours), a total capacity (e.g., expressed in terabytes) for storage arrays and a number of ports for switches, used capacity (e.g., expressed in terabytes) for storage arrays and a number of ports for switches, a list of logical data volumes created on data arrays for an application's consumption, a logical data volumes utilization (e.g., expressed in gigabytes), list of servers (clients) connected to logical data volumes, etc. For example, the system may determine a first process performed by the first application. The system may determine a data volume created on a data array for consumption by the first application during the first process. In another example, the system may determine a first process performed by the first application. The system may determine watt-hour power consumption by the first application during the first process. In another example, the system may determine a first process performed by the first application. The system may determine a number of ports for switches dedicated to the first application during the first process. In another example, the system may determine a first process performed by the first application. The system may determine a number of data arrays created for the first application during the first process.

At step 406, process 400 (e.g., using one or more components described above) determines a first subset of devices. For example, the system may determine, from the plurality of devices, a first subset of devices for serving the first application based on the first usage metric. For example, the system may determine what devices of a plurality of available devices are used to serve the first application.

In some embodiments, the system may determine a subset of devices that are serving a given application. To do so, the system may retrieve application and/or device identifiers for devices active during a process of the application. For example, the system may determine a number of devices of the plurality of devices required by the first application based on the first usage metric. The system may determine the first subset of devices based on the number of devices. In another example, the system may determine a first process performed by the first application based on the first usage metric. The system may filter the plurality of devices based on whether a respective device is utilized during the first process.

At step 408, process 400 (e.g., using one or more components described above) retrieves, from a device profile repository, a first subset of device profiles corresponding to devices in the first subset of devices. For example, the system may retrieve, from a device profile repository, a first subset of device profiles corresponding to devices in the first subset of devices, wherein the device profile repository comprises a first set of device profiles corresponding to devices with known specifications and a second set of device profiles corresponding to devices with virtual specifications. The system may generate a device profile that comprises both known device profiles as well as virtual device profiles.

The system may, in some embodiments, use an artificial intelligence model. For example, the system may generate a first feature input, wherein the first feature input is based on the first application and the first subset of devices. The system may then input the first feature input into the first model, wherein the first model comprises an artificial intelligence model.

The system may use one or more methodologies for generating the device profile repository. In particular, the system may use one or more methodologies for generating virtual device profiles and/or determining virtual specifications for a device. In some embodiments, the system may determine an aggregate carbon impact for one or more devices. For example, the system may retrieve known specifications for one or more devices that are connected to (or accessed with) a device with an unknown specification. The system may then determine a component carbon impact for the one or more devices and then determine a difference between the component carbon impact and the aggregate carbon impact. The system may then use the difference to estimate the virtual specification.

For example, the system may retrieve an aggregate carbon impact for a first device and a second device. The system may retrieve a first device profile for the first device, wherein the first device profile is based on a first known specification. The system may determine a first component carbon impact for the first device based on the first known specification. The system may determine a difference between the first component carbon impact and the aggregate carbon impact. The system may determine a second component carbon impact for the second device based on the difference. The system may determine a second virtual specification for the second device based on the second component carbon impact.

In some embodiments, the system may determine an aggregate processing metric for one or more devices. A processing metric may comprise a qualitative or quantitative metric resulting from a process performed by an application. For example, the processing metric may comprise a metric related to the performance of one or more application functions (e.g., how quickly data is processed, how quickly data is stored, etc.). For example, the system may retrieve known specifications for one or more devices that are connected to (or accessed with) a device with an unknown specification. The system may then determine a component processing metric for the one or more devices and then determine a difference between the component processing metric and the aggregate processing metric. The system may then use the difference to estimate the virtual specification.

For example, the system may retrieve an aggregate processing metric for a first device and a second device. The system may retrieve a first device profile for the first device, wherein the first device profile is based on a first known specification. The system may determine a first component processing metric for the first device based on the first known specification. The system may determine a difference between the first component processing metric and the aggregate processing metric. The system may determine a second processing metric for the second device based on the difference. The system may determine a second virtual specification for the second device based on the second processing metric.

In some embodiments, the system may determine a network mapping for a network, and the system may generate the virtual device profiles based on the network mapping. For example, the system may determine relationships between devices in the mapping. The relationships may comprise information about how devices are connected, how devices are used, and/or what devices are grouped when performing one or more processes for one or more applications. Within the network mapping, each device (or group of devices) may be represented by a node. The system may then determine known node characteristics (e.g., a processing metric, carbon impact, energy consumption metric, etc.) and use the known node characteristics to determine the virtual node characteristics. For example, the node characteristics may comprise a metric related to the performance of one or more application functions (e.g., how quickly data is processed, how quickly data is stored, etc.). For example, the system may retrieve known node characteristics for one or more devices that are connected to (or accessed with) a device with an unknown specification. The system may then determine a component node characteristic for the one or more devices and then determine a difference between the component node characteristics and the aggregate node characteristics. The system may then use the difference to estimate the virtual specification.

For example, the system may retrieve a network mapping for the first network, wherein the network mapping indicates relationships between the plurality of devices, and wherein each of the plurality of devices is represented by respective nodes in the network mapping. The system may identify a first node subset of the respective nodes, wherein the first node subset comprises nodes with respective known specifications. The system may generate a known network mapping based on populating the network mapping at each node of the first node subset with the respective known specifications. The system may identify a second node subset of the respective nodes, wherein the second node subset comprises nodes with respective unknown specifications, and wherein the second node subset comprises unpopulated nodes in the known network mapping. The system may infer respective virtual specifications for each node in the second node subset based on the relationships between the plurality of devices and the respective known specifications in the known network mapping.

At step 410, process 400 (e.g., using one or more components described above) determines a first output based on the first subset of device profiles. For example, the system may determine, using a first model, a first output, wherein the first model is trained to generate application-specific power consumption predictions for respective applications based on inputted usage metrics for the respective applications and respective device profiles, from the device profile repository, for devices serving the respective applications. The system may use a model to determine application-specific power consumption prediction using one or more models. In some embodiments, the system may use artificial intelligence models (e.g., as described in FIG. 3 above). In some embodiments, the system may use other model techniques.

In some embodiments, the system may generate an output that is used by the system to determine an application-specific power consumption prediction. In some embodiments, the output may comprise the power consumption prediction. Additionally or alternatively, the system may reformat the output into the power consumption prediction and/or based the power consumption prediction on the output. For example, the system may determine a carbon impact for serving the first application with the first subset. The system may determine the first application-specific power consumption prediction based on the carbon impact.

At step 412, process 400 (e.g., using one or more components described above) generates a first application-specific power consumption prediction based on the first output. For example, the system may generate for display, on a user interface, the first application-specific power consumption prediction based on the first output. In some embodiments, the application-specific power consumption prediction may comprise a prediction related to a past, current, and/or future use of power. Additionally or alternatively, the system may express the prediction in terms of carbon impact.

In some embodiments, the application-specific power consumption prediction and/or its carbon impact may be based on a type of power source powering the devices. For example, the system may account for the carbon impact of different manners in which electricity for a given device is generated. For example, the system may determine a different carbon impact for devices powered by solar or wind power from that of coal or nuclear power. That is, the system may determine an average or aggregate carbon impact ratio for the power source (e.g., based on third party information) and adjust the carbon impact accordingly. For example, the system may determine a power source for powering the first subset. The system may determine the carbon impact ratio for the power source. The system may adjust the carbon impact based on the carbon impact ratio.

In some embodiments, the system may determine the type of power source based on a geographic location (or network location) of a power source. For example, the system may determine that a server farm is in a geographic location that is served by a particular power source (or a series of different power sources, which may be defined by a percentage). For example, the system may determine a geographic location for the first subset. The system may determine the power source based on the geographic location. In another example, the system may determine a network location for the first subset. The system may determine the power source based on the network location.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing power consumption predictions for selected applications within network arrangements featuring devices with non-homogenous or unknown specifications.

2. The method of any one of the preceding embodiments, further comprising: generating a network mapping for a first network, wherein the network mapping indicates relationships between a plurality of devices in the first network, and wherein each of the plurality of devices is represented by respective nodes in the network mapping, wherein the respective nodes comprises a first node subset and a second node subset, wherein the first node subset comprises nodes with respective known specifications, wherein the respective known specifications are based on respective vendor information, respective model information, respective serial number information, or respective geographical location information, wherein the second node subset comprises nodes with respective virtual specifications, and wherein the respective virtual specifications are inferred based on the relationships between the plurality of devices and the respective known specifications; and populating a device profile repository based on the network mapping.

3. The method of any one of the preceding embodiments, further comprising: receiving a first user request to generate a first application-specific power consumption prediction for a first application; determining a first usage metric for the first application, wherein the first usage metric describes metadata related to one or more processes performed by the first application across a first network, wherein the first network comprises a plurality of devices; determining, from the plurality of devices, a first subset of devices for serving the first application based on the first usage metric; retrieving, from a device profile repository, a first subset of device profiles corresponding to devices in the first subset of devices, wherein the device profile repository comprises a first set of device profiles corresponding to devices with known specifications and a second set of device profiles corresponding to devices with virtual specifications; determining, using a first model, a first output, wherein the first model is trained to generate application-specific power consumption predictions for respective applications based on inputted usage metrics for the respective applications and respective device profiles, from the device profile repository, for devices serving the respective applications; and generating for display, on a user interface, the first application-specific power consumption prediction based on the first output.

4. The method of any one of the preceding embodiments, wherein generating the device profile repository further comprises: retrieving an aggregate carbon impact for a first device and a second device; retrieving a first device profile for the first device, wherein the first device profile is based on a first known specification; determining a first component carbon impact for the first device based on the first known specification; determining a difference between the first component carbon impact and the aggregate carbon impact; determining a second component carbon impact for the second device based on the difference; and determining a second virtual specification for the second device based on the second component carbon impact.

5. The method of any one of the preceding embodiments, wherein generating the device profile repository further comprises: retrieving an aggregate processing metric for a first device and a second device; retrieving a first device profile for the first device, wherein the first device profile is based on a first known specification; determining a first component processing metric for the first device based on the first known specification; determining a difference between the first component processing metric and the aggregate processing metric; determining a second processing metric for the second device based on the difference; and determining a second virtual specification for the second device based on the second processing metric.

6. The method of any one of the preceding embodiments, wherein generating the device profile repository further comprises: retrieving a network mapping for the first network, wherein the network mapping indicates relationships between the plurality of devices, and wherein each of the plurality of devices is represented by respective nodes in the network mapping; identifying a first node subset of the respective nodes, wherein the first node subset comprises nodes with respective known specifications; generating a known network mapping based on populating the network mapping at each node of the first node subset with the respective known specifications; identifying a second node subset of the respective nodes, wherein the second node subset comprises nodes with respective unknown specifications, and wherein the second node subset comprises unpopulated nodes in the known network mapping; and inferring respective virtual specifications for each node in the second node subset based on the relationships between the plurality of devices and the respective known specifications in the known network mapping.

7. The method of any one of the preceding embodiments, wherein determining the first usage metric for the first application further comprises: determining a first process performed by the first application; and determining a data volume created on a data array for consumption by the first application during the first process.

8. The method of any one of the preceding embodiments, wherein determining the first usage metric for the first application further comprises: determining a first process performed by the first application; and determining watt-hour power consumption by the first application during the first process.

9. The method of any one of the preceding embodiments, wherein determining the first usage metric for the first application further comprises: determining a first process performed by the first application; and determining a number of ports for switches dedicated to the first application during the first process.

10. The method of any one of the preceding embodiments, wherein determining the first usage metric for the first application further comprises: determining a first process performed by the first application; and determining a number of data arrays created for the first application during the first process.

11. The method of any one of the preceding embodiments, wherein determining the first subset of devices for serving the first application based on the first usage metric further comprises: determining a number of devices of the plurality of devices required by the first application based on the first usage metric; and determining the first subset of devices based on the number of devices.

12. The method of any one of the preceding embodiments, wherein determining the first subset of devices for serving the first application based on the first usage metric further comprises: determining a first process performed by the first application based on the first usage metric; and filtering the plurality of devices based on whether a respective device is utilized during the first process.

13. The method of any one of the preceding embodiments, wherein determining the first output further comprises: determining a carbon impact for serving the first application with the first subset; and determining the first application-specific power consumption prediction based on the carbon impact.

14. The method of any one of the preceding embodiments, wherein determining the first application-specific power consumption prediction based on the carbon impact further comprises: determining a power source for powering the first subset; determining carbon impact ratio for the power source; and adjusting the carbon impact based on the carbon impact ratio.

15. The method of any one of the preceding embodiments, wherein determining the power source for powering the first subset further comprises: determining a geographic location for the first subset; and determining the power source based on the geographic location.

16. The method of any one of the preceding embodiments, wherein determining the power source for powering the first subset further comprises: determining a network location for the first subset; and determining the power source based on the network location.

17. The method of any one of the preceding embodiments, wherein determining the first output further comprises: generating a first feature input, wherein the first feature input is based on the first application and the first subset of devices; and inputting the first feature input into the first model, wherein the first model comprises an artificial intelligence model.

18. The method of any one of the preceding embodiments, further comprising: retrieving a network mapping for a first network, wherein the network mapping indicates relationships between a plurality of devices, and wherein each of the plurality of devices is represented by respective nodes in the network mapping; identifying a first node subset of the respective nodes, wherein the first node subset comprises nodes with respective known specifications; generating a known network mapping based on populating the network mapping at each node of the first node subset with the respective known specifications; identifying a second node subset of the respective nodes, wherein the second node subset comprises nodes with respective unknown specifications, and wherein the second node subset comprises unpopulated nodes in the known network mapping; inferring respective virtual specifications for each node in the second node subset based on the relationships between the plurality of devices and the respective known specifications in the known network mapping; generating a device profile repository based on populating the known network mapping with the respective virtual specifications for each node in the second node subset; receiving a first user request to generate a first application-specific power consumption prediction for a first application; determining, from the plurality of devices, a first subset of devices for serving the first application; retrieving, from the device profile repository, a first subset of device profiles corresponding to devices in the first subset of devices; and generating for display, on a user interface, the first application-specific power consumption prediction based on the first subset of device profiles.

19. A tangible, non-transitory, machine-readable medium storing instructions that, when executed by a data processing apparatus, cause the data processing apparatus to perform operations comprising those of any of embodiments 1-18.

20. A system comprising one or more processors; and memory storing instructions that, when executed by the processors, cause the processors to effectuate operations comprising those of any of embodiments 1-18.

21. A system comprising means for performing any of embodiments 1-18.

What is claimed is:

1. A system for providing power consumption predictions for selected applications within network arrangements featuring devices with non-homogenous or unknown specifications, the system comprising:
    one or more processors; and
    a non-transitory, computer-readable medium comprising instructions recorded thereon that when executed by the one or more processors cause operations comprising:
        generating a network mapping for a first network, wherein the network mapping indicates relationships between a plurality of devices in the first network, and wherein each of the plurality of devices is represented by respective nodes in the network mapping, wherein the respective nodes comprise a first node subset and a second node subset, wherein the first node subset comprises nodes with respective known specifications, wherein the respective known specifications are based on respective vendor information, respective model information, respective serial number information, or respective geographical location information, wherein the second node subset comprises nodes with respective virtual specifications, and wherein the respective virtual specifications are inferred based on the relationships between the plurality of devices and the respective known specifications;
        populating a device profile repository based on the network mapping;
        receiving a first user request to generate a first application-specific power consumption prediction for a first application;
        determining a first usage metric for the first application, wherein the first usage metric describes metadata related to one or more processes performed by the first application across a first network, wherein the first network comprises a plurality of devices;
        determining, from the plurality of devices, a first subset of devices for serving the first application based on the first usage metric;
        retrieving, from the device profile repository, a first subset of device profiles corresponding to devices in the first subset of devices;
        determining, using a first artificial intelligence model, a first output, wherein the first artificial intelligence model is trained to generate application-specific power consumption predictions for respective applications based on inputted usage metrics for the respective applications and respective device profiles, from the device profile repository, for devices serving the respective applications; and
        generating for display, on a user interface, the first application-specific power consumption prediction based on the first output.

2. A method for providing power consumption predictions for selected applications within network arrangements featuring devices with non-homogenous or unknown specifications, the method comprising:
    receiving a first user request to generate a first application-specific power consumption prediction for a first application;

determining a first usage metric for the first application, wherein the first usage metric describes metadata related to one or more processes performed by the first application across a first network, wherein the first network comprises a plurality of devices;

determining, from the plurality of devices, a first subset of devices for serving the first application based on the first usage metric;

retrieving, from a device profile repository, a first subset of device profiles corresponding to devices in the first subset of devices, wherein the device profile repository comprises a first set of device profiles corresponding to devices with known specifications and a second set of device profiles corresponding to devices with virtual specifications;

determining, using a first model, a first output, wherein the first model is trained to generate application-specific power consumption predictions for respective applications based on inputted usage metrics for the respective applications and respective device profiles, from the device profile repository, for devices serving the respective applications; and generating for display, on a user interface, the first application-specific power consumption prediction based on the first output.

3. The method of claim 2, wherein generating the device profile repository further comprises:
retrieving an aggregate carbon impact for a first device and a second device;
retrieving a first device profile for the first device, wherein the first device profile is based on a first known specification;
determining a first component carbon impact for the first device based on the first known specification;
determining a difference between the first component carbon impact and the aggregate carbon impact;
determining a second component carbon impact for the second device based on the difference; and
determining a second virtual specification for the second device based on the second component carbon impact.

4. The method of claim 2, wherein generating the device profile repository further comprises:
retrieving an aggregate processing metric for a first device and a second device;
retrieving a first device profile for the first device, wherein the first device profile is based on a first known specification;
determining a first component processing metric for the first device based on the first known specification;
determining a difference between the first component processing metric and the aggregate processing metric;
determining a second processing metric for the second device based on the difference; and
determining a second virtual specification for the second device based on the second processing metric.

5. The method of claim 2, wherein generating the device profile repository further comprises:
retrieving a network mapping for the first network, wherein the network mapping indicates relationships between the plurality of devices, and wherein each of the plurality of devices is represented by respective nodes in the network mapping;
identifying a first node subset of the respective nodes, wherein the first node subset comprises nodes with respective known specifications;
generating a known network mapping based on populating the network mapping at each node of the first node subset with the respective known specifications;
identifying a second node subset of the respective nodes, wherein the second node subset comprises nodes with respective unknown specifications, and wherein the second node subset comprises unpopulated nodes in the known network mapping; and
inferring respective virtual specifications for each node in the second node subset based on the relationships between the plurality of devices and the respective known specifications in the known network mapping.

6. The method of claim 2, wherein determining the first usage metric for the first application further comprises:
determining a first process performed by the first application; and
determining a data volume created on a data array for consumption by the first application during the first process.

7. The method of claim 2, wherein determining the first usage metric for the first application further comprises:
determining a first process performed by the first application; and
determining watt-hour power consumption by the first application during the first process.

8. The method of claim 2, wherein determining the first usage metric for the first application further comprises:
determining a first process performed by the first application; and
determining a number of ports for switches dedicated to the first application during the first process.

9. The method of claim 2, wherein determining the first usage metric for the first application further comprises:
determining a first process performed by the first application; and
determining a number of data arrays created for the first application during the first process.

10. The method of claim 2, wherein determining the first subset of devices for serving the first application based on the first usage metric further comprises:
determining a number of devices of the plurality of devices required by the first application based on the first usage metric; and
determining the first subset of devices based on the number of devices.

11. The method of claim 2, wherein determining the first subset of devices for serving the first application based on the first usage metric further comprises:
determining a first process performed by the first application based on the first usage metric; and
filtering the plurality of devices based on whether a respective device is utilized during the first process.

12. The method of claim 2, wherein determining the first output further comprises:
determining a carbon impact for serving the first application with the first subset; and
determining the first application-specific power consumption prediction based on the carbon impact.

13. The method of claim 12, wherein determining the first application-specific power consumption prediction based on the carbon impact further comprises:
determining a power source for powering the first subset;
determining carbon impact ratio for the power source; and
adjusting the carbon impact based on the carbon impact ratio.

14. The method of claim 13, wherein determining the power source for powering the first subset further comprises:

determining a geographic location for the first subset; and
determining the power source based on the geographic location.

15. The method of claim 13, wherein determining the power source for powering the first subset further comprises:
determining a network location for the first subset; and
determining the power source based on the network location.

16. The method of claim 2, wherein determining the first output further comprises:
generating a first feature input, wherein the first feature input is based on the first application and the first subset of devices; and
inputting the first feature input into the first model, wherein the first model comprises an artificial intelligence model.

17. A non-transitory, computer-readable medium comprising instructions recorded thereon that when executed by one or more processors cause operations comprising:
retrieving a network mapping for a first network, wherein the network mapping indicates relationships between a plurality of devices, and wherein each of the plurality of devices is represented by respective nodes in the network mapping;
identifying a first node subset of the respective nodes, wherein the first node subset comprises nodes with respective known specifications;
generating a known network mapping based on populating the network mapping at each node of the first node subset with the respective known specifications;
identifying a second node subset of the respective nodes, wherein the second node subset comprises nodes with respective unknown specifications, and wherein the second node subset comprises unpopulated nodes in the known network mapping;
inferring respective virtual specifications for each node in the second node subset based on the relationships between the plurality of devices and the respective known specifications in the known network mapping;
generating a device profile repository based on populating the known network mapping with the respective virtual specifications for each node in the second node subset;
receiving a first user request to generate a first application-specific power consumption prediction for a first application;
determining, from the plurality of devices, a first subset of devices for serving the first application;
retrieving, from the device profile repository, a first subset of device profiles corresponding to devices in the first subset of devices; and
generating for display, on a user interface, the first application-specific power consumption prediction based on the first subset of device profiles.

18. The non-transitory, computer-readable medium of claim 17, wherein determining the first application-specific power consumption prediction further comprises:
determining a carbon impact for serving the first application with the first subset; and
determining the first application-specific power consumption prediction based on the carbon impact.

19. The non-transitory, computer-readable medium of claim 18, wherein determining the first application-specific power consumption prediction based on the carbon impact further comprises:
determining a power source for powering the first subset;
determining carbon impact ratio for the power source; and
adjusting the carbon impact based on the carbon impact ratio.

20. The non-transitory, computer-readable medium of claim 19, wherein determining the power source for powering the first subset further comprises:
determining a geographic location for the first subset; and
determining the power source based on the geographic location.

* * * * *